S. D. SPRONG & W. E. McCOY.
MEANS FOR PREVENTING CURRENT LEAKAGE IN ELECTRIC CABLES.
APPLICATION FILED DEC. 12, 1916.

1,237,401. Patented Aug. 21, 1917.

INVENTORS
Severn D. Sprong
Walter E. McCoy
BY
Paul Benjamin
Their ATTORNEY

UNITED STATES PATENT OFFICE.

SEVERN D. SPRONG AND WALTER E. McCOY, OF NEW YORK, N. Y.

MEANS FOR PREVENTING CURRENT LEAKAGE IN ELECTRIC CABLES.

1,237,401.  Specification of Letters Patent.  Patented Aug. 21, 1917.

Application filed December 12, 1916. Serial No. 136,401.

*To all whom it may concern:*

Be it known that we, SEVERN D. SPRONG and WALTER E. McCOY, citizens of the United States, residing at New York, in the county of New York and State of New York, have invented a certain new and useful Improvement in Means for Preventing Current Leakage in Electric Cables, of which the following is a specification.

The invention is a pot-head for the end of a high tension cable, so constructed as to prevent current leakage from the conductors of said cable to the metal of the pothead, and so elsewhere—as to other cables or to ground. The invention consists in the construction more particularly pointed out in the claims.

In the accompanying drawings—

Figure 1:
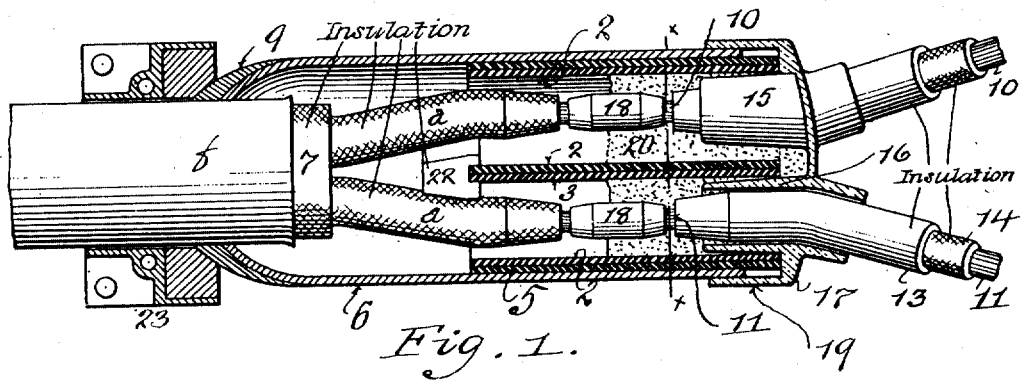
Figures 2, 3:
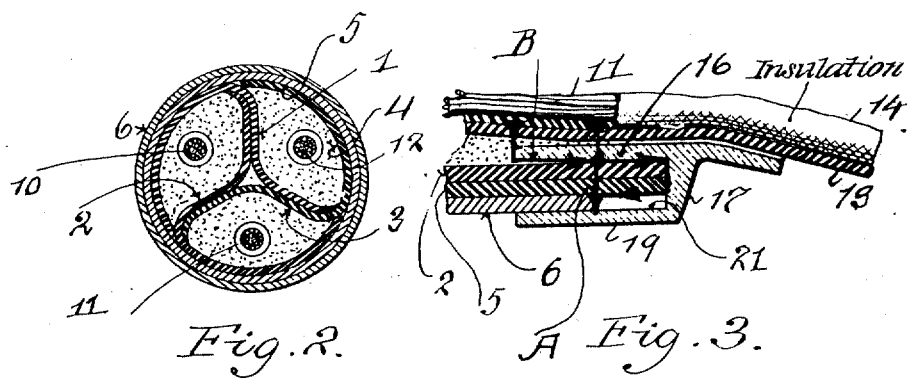

Figure 1 is a longitudinal section of our pot-head. Fig. 2 is a cross section on the line x, x of Fig. 1. Fig. 3 is an enlarged longitudinal section of the cover joint.

Similar numbers of reference indicate like parts.

Our pot-head is herein shown applied to a cable constructed as set forth in U. S. Letters Patent No. 1,165,141, granted to us December 21st, 1915. Said cable comprises three longitudinally bent and mutually interlocking plates 1, 2, 3, of insulating material, which unitedly form a tube 4 divided interiorly into three compartments. Said plates are incased in a complete tube or cylinder 5 of insulating material, and said tube in turn is inserted in the open end of a metal pot 6. The line cable has three metallic conductors—two, *a, a*, shown in Fig. 1—provided with the usual individual insulation and inclosed in a single insulating sheath 7, which sheath in turn is inclosed in the metal sheath 8. Said line cable enters the pot 6 through an opening in the bottom thereof, and is here shown secured to said pot by a wiped joint 9.

The branch conductors to be connected to the three conductors of the line cable are shown at 10, 11, 12. Each has two insulating envelops 13, 14. Said branch conductors 10, 11, 12 respectively pass through three sleeves (two shown at 15, 16 in Fig. 1) formed integrally on the inner side of the flanged cover 17 of porcelain or other material. Said sleeves extend into the compartments formed by plates 1, 2, 3. The metallic conductors of the line cable are connected to the metallic conductors 10, 11, 12 of the branch lines by couplings 18 within said compartments.

It is to be particularly noted that the outer end of the tube or cylinder 5 and the outer ends of the plates 1, 2, 3 extend beyond the outer end of pot 6, so that the inner face of said cover bears against the ends of said tube and plates, and its flange 19 extends over the end portion of the pot 6.

In this way, we form a closed annular air space 21 between the extremity of pot 6 and the inner surface of cover 17.

The entire space within the pot is to be filled with any suitable insulating compound, which may be introduced in a plastic state and allowed to harden. In Fig. 1 only the outer portion of the pot, shown at 20, is so filled, the remainder being represented as unfilled, more clearly to show the construction. A spreading block 22 of solid insulating material, supported in any suitable way, may be placed between the conductors of the line cable. The pot may be supported on a fixed lug or bracket, indicated at 23.

Particular attention is now called to Fig. 3. The object of the construction here is to prevent current leakage at the joint. This we accomplish by making the path of the leakage current longer and to offer more resistance than the dielectric path. Thus in Fig. 3, the dielectric path from the metal conductor 11 to the metal wall of pot 6 is represented by the straight arrow A. On the other hand, the leakage path of current from the said conductor 11 to pot 6 is represented by the bent arrow B. In other words, any leakage current from conductor 11, after traversing the insulation on said conductor and the filling around said insulation, must travel along the joint between cover sleeve 16 and the wall of the compartment formed by the bent plate 3, then around the end of said plate and of the inclosing cylinder 5, and then along the outer surface of said cylinder before it can reach the end of pot 6.

We claim:

1. A pot-head for high tension electric cables, comprising two tubular casings of insulating material, one within the other and separated by an air space, a plate of insulating material closing one side of said space, and a tubular casing of metal having one end partly filling and closing the other side of said space.

2. A pot-head for high tension electric cables, comprising a metal pot having an opening in its closed end, a tubular casing of insulating material within said pot and extending beyond the outer end thereof, a flanged cover of insulating material for said pot having an opening, and a sleeve on the inner side of said cover registering with said opening and entering said casing; whereby an annular air space is formed between said cover and the end of said pot and surrounding the protruding end portion of said casing.

3. A pot-head for high tension metal sheathed electric cables, comprising a metal pot having an opening in its bottom receiving said cable and at said opening being electrically connected to the cable sheath, a flanged cover of insulating material for the open end of said pot, a sleeve of insulating material on the inner side of said cover, a tubular casing of insulating material within said pot and receiving said sleeve, a conductor passing through said sleeve, entering said tubular casing and being electrically connected therein, and a filling of insulating material within said pot and said casing; the said casing extending beyond the outer end of said pot, and the said cover flange extending over the end portion of said pot, whereby an annular air space is formed between said cover and the end of said pot, and surrounding the protruding end portion of said casing.

4. A pot-head for high tension metal sheathed electric cables, comprising a metal pot having an opening in its bottom receiving said cable and at said opening being electrically connected to the cable sheath, a flanged cover of insulating material for the open end of said pot, sleeves of insulating material on the inner side of said cover, a tubular casing of insulating material within said pot, partitions of insulating material within said casing dividing the same into longitudinal compartments respectively receiving said sleeves, the conductors of said cable respectively entering said compartments, branch conductors passing through said cover sleeves and entering said compartments and electrically connected therein to the said cable conductors, and a filling of insulating material within said pot and said casing; the said casing extending beyond the outer end of said pot, and the said cover flange extending over the end portion of said pot, whereby an annular air space is formed between said cover and the end of said pot, and surrounding the protruding end portion of said casing.

5. A pot-head for high tension electric cables, comprising a metal pot having an opening in its bottom, a tubular casing of insulating material within said pot, a cover of insulating material for said pot having an opening, a sleeve on the inner side of said cover registering with said opening, and two line conductors respectively entering said pot and said casing through said bottom pot opening and said cover opening and united together within said casing.

In testimony whereof we have affixed our signatures in presence of two witnesses.

SEVERN D. SPRONG.
WALTER E. McCOY.

Witnesses:
GERTRUDE T. PORTER,
MAY T. McGARRY.

Copies of this patent may be obtained for five cents each, by addressing the "Commissioner of Patents, Washington, D. C."